Nov. 18, 1969  C. E. JACKSON  3,478,885
HORIZONTAL ROTARY FILTER ASSEMBLY
Filed Jan. 10, 1967  4 Sheets-Sheet 3

INVENTOR.
CLIFFORD E. JACKSON
BY
ATTORNEY.

INVENTOR.
CLIFFORD E. JACKSON
ATTORNEY.

United States Patent Office 3,478,885
Patented Nov. 18, 1969

3,478,885
HORIZONTAL ROTARY FILTER ASSEMBLY
Clifford E. Jackson, Orillia, Ontario, Canada, assignor to Dorr-Oliver Incorporated, Stamford, Conn., a corporation of Delaware
Filed Jan. 10, 1967, Ser. No. 608,297
Int. Cl. B01d 25/32, 25/02
U.S. Cl. 210—194                    8 Claims

ABSTRACT OF THE DISCLOSURE

A vertically stacked assembly of horizontal filter pans mounted on a vertical central hollow shaft having internal transverse partitions subdividing the interior of the shaft into vertical ducts each having upper filtrate openings communicating with each pan and lower filtrate discharge openings for each pan, and stationary valve means surrounding the shaft and each set of filtrate discharge openings for controlling the filtration cycle.

---

This invention relates to horizontal rotary filters and is particularly concerned with a filter assembly having two or more horizontal filters arranged in a vertical array.

As is well known to those engaged in the manufacture or use of industrial filtering equipment, a horizontal rotary filter consists of a circular filter pan mounted for rotation in a horizontal plane around a vertical axis. The pulp or other slurry to be dewatered or washed is poured on the surface of the filter medium carried on the bottom of the pan and the filtrate is drawn through the filter medium under vacuum pressure with the filter cake subsequently being scraped off the pan at a later stage in the rotation cycle.

Heretofore it has been the common practice that when any particular filtering plant has required a plurality of filter pans, the pans have been arranged side by side, thereby taking up considerable floor space and requiring separate drive mechanisms for each unit. Further, the use of side by side pans in a multi-stage washing system has required the use of pumps to move the pulp from one pan to the other.

It is, therefore, an object of this invention to provide a horizontal rotary filter assembly which is adapted to take advantage of horizontal filter operation and multistage washing in the least possible floor space.

It is a further object of the invention to provide a horizontal rotary filter assembly wherein a single drive unit may be employed to operate a plurality of filter pans.

It is a still further object of the invention to provide a horizontal rotary filter assembly which may utilize gravity to transfer the pulp or other slurry from one pan to the other.

It is a still further object of the invention to effect an economy in mounting structures for horizontal rotary filters so as to avoid the need to provide a separate mounting structure for each pan in a multi-pan plant.

The above and further objects of the invention are accomplished by mounting a plurality of horizontal filters in a vertical array. By this means it is possible to employ a single unit to rotate all of the pans in the vertical array and it is also possible to eliminate the use of pumps between the filter pans and to rely on gravity to transport the pulp from one pan to the other. Even in the case of parallel thickening and washing, the vertical arrangement provides the advantage that the pulp or other slurry can be fed into a common take-off chute where it falls by gravity to a single collector. Of even greater importance, of course, the vertical array effects a great saving in floor space.

The invention is also characterized by a particular form of central vertical column on which the filter pans are carried. This column can be compartmented whereby to keep separte the various strength liquors as they are drawn from the filter pans so that where it is desired to carry out countercurrent washing, the liquors of varying strength are available. In connection with this compartmented central column, the invention also provides valves of particular construction whereby the various liquors may be taken from the central column even though the column is constantly rotated.

The above and further objects of the invention and preferred methods for achieving these objects will be better understood from the following description of a preferred embodiment of the invention as read in conjunction with the accompanying drawings.

Figure 1:
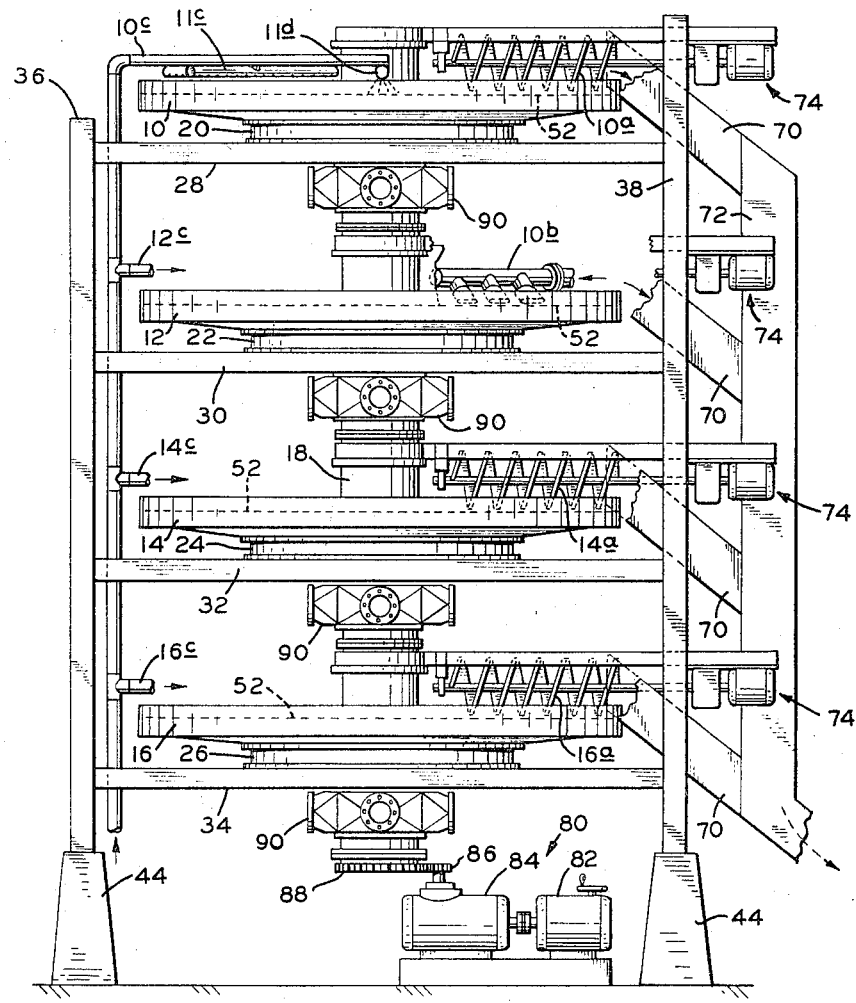
FIGURE 1 is a front elevation view, partly broken away, of a horizontal rotary filter assembly in accord with this preferred embodiment of the invention.

Referring to FIGURE 1, the basic concept of the invention will be readily apparent. It comprises a horizontal rotary filter assembly having a plurality of filter pans arranged in a vertical array. Each individual pan is not unlike the known type of horizontal rotary filter pan which has been in manufacture for several years and the chief advantages of the present invention are gained by stacking these pans one above the other.

Each of the pans 10 to 16 are mounted on a rotatable central shaft 18. This shaft is used to both effect rotation of the pans and to draw off the various washing liquors or filtrates. To carry out the latter function, the shaft is hollow and in a preferred form of the invention it is also compartmented, as is explained hereinafter. The shaft is mounted in a number of bearings 20 to 26 which are supported by pairs of cross members 28 to 34 which together with vertical structural elements 36 to 42 constitute a supporting frame for the assembly. The vertical members are supported on concrete or the like pylons 44. Various modifications of this particular supporting frame can be made without departing from the scope of the invention.

Each individual filter pan is provided with the usual devices for feeding the material to be washed or dewatered onto the pan, for removing the filtered material and for feeding the wash water. The devices referred to are the take-off scrolls 10a to 16a, the pulp feed pipes 10b to 16b and the washing liquid feed lines 10c to 16c. In the interests of clarification, not all of these devices are shown in FIGURE 1. The normal variations in the arrangement of these devices can also be made in modifying the illustrated assembly. For example, while only one take-off scroll and feed pipe for each filter pan is shown in the drawings, a plurality of feed points and take-off points can be used for one or more of the filter pans. Similarly, in the illustrated assembly the wash water feeding pipe 10c is shown divided as to direct wash water on to the pan at four circumferentially spaced points by spray heads 11a to 11d but if desired for any particular washing operation, the wash water may be fed on to the pan at only one point or at any number of points other than the four points illustrated. In other words, the basic inventive concept of the invention is the principle of arranging the pans in a vertical array and the same variations as are normally made with single horizontal filter pans can be made with the plurality of filter pans of the illustrated assembly.

Figure 3:
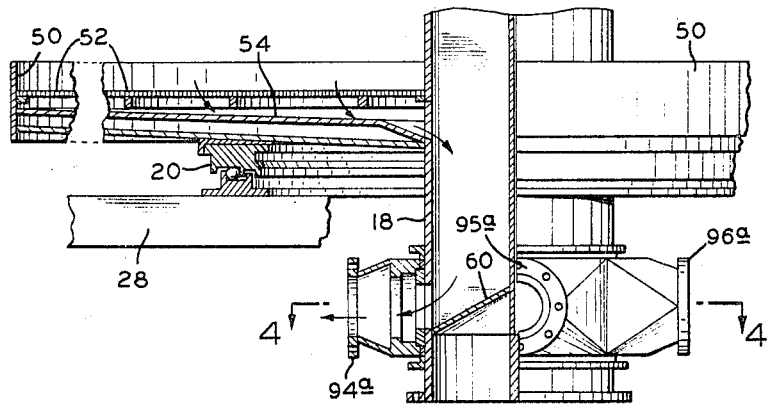
FIGURE 3 is a vertical cross-sectional view taken along the line 3—3 of FIGURE 2.

Referring now to FIGURE 3, it can be seen that the individual filter pans are constructed quite similarly to the known filter pans in that they essentially consist of an outer circular wall 50, a bottom structure supporting a screen 52 on which is laid the filtering mat which may be formed of a number of materials well known to those familiar with these horizontal filters and a sloped lower bottom wall 54 for receiving the filtrate and directing it radially inward to the central column 18. As will be also well understood by those familiar with this type of equipment, the filtering or washing process is assisted by forming a vacuum pressure beneath the screen.

As mentioned above, the central column 18 is hollow. For carrying out relatively simple processes, the column may not be compartmented so that all of the filtrates are simply fed into the column and are collected at the bottom of the column by a suitable take-off arrangement. In the illustrated case, however, the column is compartmented whereby the various strength liquors may be kept separated from one another for any one of a number of different reasons. When it is stated that the column is compartmented, it is meant that the column may have a plurality of longitudinally extending partitions and/or a plurality of transverse partitions. The longitudinal or vertical partitions serve to keep separate the several liquors coming off the same filter pan while the transverse partitions keep separate the liquors from different pans. An example of a transverse partition is shown in FIGURE 3. This partition 60 is set at an angle as to divert the dropping filtrates to the take-off valve outlets with a minimum of turbulence.

Figure 2:
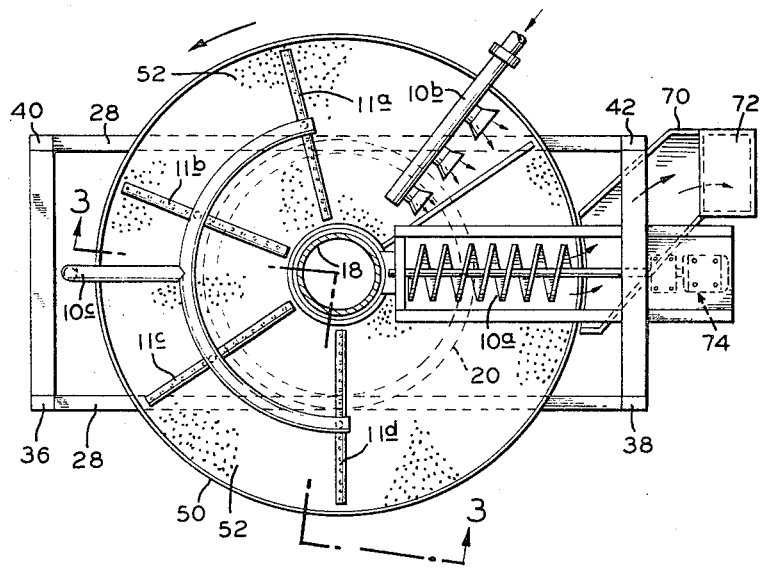
FIGURE 2 is a top view of the assembly shown in FIGURE 1.

Referring again to FIGURE 1, it is to be noted that the illustrated arrangement for taking the pulp or other washed material off the pans is designed to feed the pulp into a common vertical chute in which it falls to a common collector. As can be seen in FIGURE 2, the take-off chutes 70 are offset from the longitudinal axes of the scrolls as to avoid interference between the vertical chute 72 and the drive mechanisms 74 for the scrolls. It will be appreciated that the particular take-off chute arrangement illustrated is a specific arrangement for operating each of the filter pans independently. An alternative setup for operating the filter pans in series is shown schematically in FIGURE 5 and will be described in detail hereinafter.

Apart from the basic concept of mounting the filter pans in a vertical array, this invention also includes the principle of using a central rotatable column for rotating all the pans. The advantage of this arrangement is immediately obvious as where the same number of filter pans are mounted side by side, a total of four independent drive mechanisms are required. In accord with the invention, a single drive unit 80 is used to rotate all the pans. Any number of known expedients may be used to connect the drive mechanism to the central column 18. In the illustrated case, the drive mechanism consists of a motor 82, a transmission unit 84 having a drive gear 86 connected to its output shaft, with the drive gear being meshed with a larger gear 88 fixed to the lower end of column 18.

The construction of the valves mounted on the central column 18 also forms an important part of this invention. In the illustrated apparatus shown in FIGURE 1, there are four of these valves 90, one for each of the filter pans. The valves are held stationary while the central column 18 rotates within them and it is their purpose to take off the various strength filtrates from the pans. As can best be seen in FIGURE 4, each valve 90 is adapted to take off four different filtrates. However, it should be understood that the particular valve illustrated can be modified to take off more or less filtrates as desired. Further, while it is anticipated that for most installations the particular four-point take-off valve illustrated will be used, it may be not always be operated as a four-point take-off valve and it is capable of adjustment whereby from one to four take-offs may be selected.

It will be appreciated that the principle of providing vertical compartments in the central column is an essential step in the filtrate take-off arrangement as a whole. It will also be appreciated that FIGURE 2 shows an arrangement for feeding wash water on to the filter pan at four circumferentially spaced points. Thus, the take-off points at the pan will be positioned between these wash water introduction points. As the pan and the central column rotate together, the wall of the column is ported about its full circumference at the radially inward end of the vacuum chamber beneath the filter. Thus, the filtrates which are drawn towards the column by the vacuum and the downward slope of the drainboard beneath the filter enter different compartments of the central column. The function of the take-off valves is to remove these separate filtrates from the column.

Figure 4:
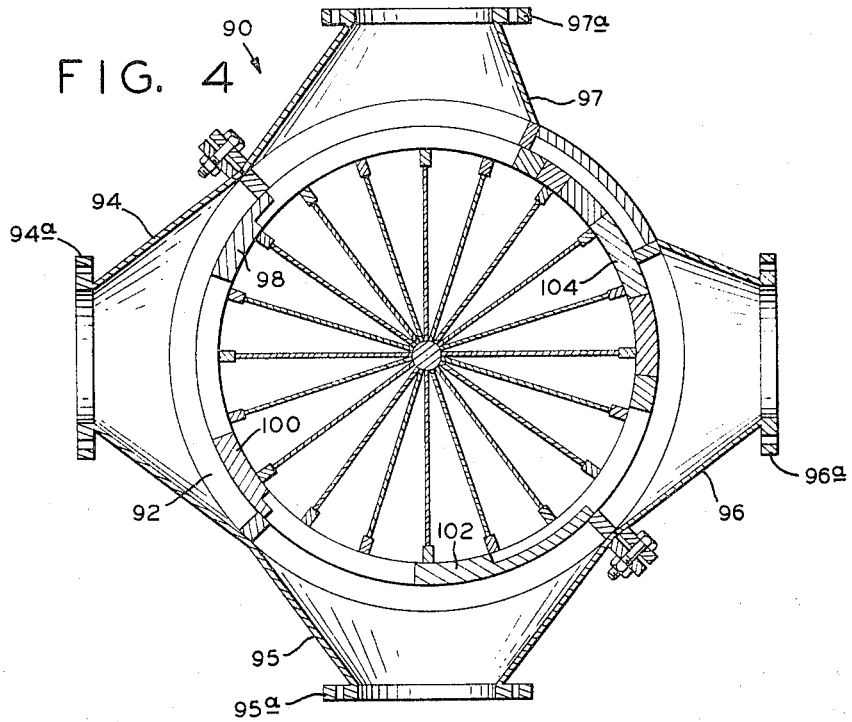
FIGURE 4 is a horizontal cross-sectional view taken along the line 4—4 of FIGURE 3.

Referring now to FIGURE 4 it can be seen that each valve includes an outer cylindrical casing 92 which is ported at four points for connections with outlet cones 94, 95, 96 and 97 carrying suitable flanges 94a, 95a, 96a and 97a, whereby connection with piping may be made. Contained within casing 92 are a plurality of bridge members 98 to 104. It is within these bridges that the central column rotates and it is the function of the bridges to block off egress of filtrate from the column whereby to permit the take-off of the filtrate at the desired points only. The bridges are capable of adjustment circumferentially so that the valve is adaptable to any take-off procedure required for any particular washing process. As the bridges are shown in FIGURE 4, the valve is adapted to take off four different filtrates and is thus illustrated to tie in with the particular washing set-up illustrated in FIGURE 2.

It is to be noted that the bridge 104 covers the greatest circumferential distance. Its function is to stop take-off of filtrate from the compartments which lie beneath the filter areas on to which the pulp is fed and from which the pulp is taken off, i.e. those compartments positioned beneath the circumferential zone in which the feed pipe 10a and the take-off scroll 10b are positioned. This can be better understood by comparing FIGURES 2 and 4 side by side. It will also be noted that the other bridges 98, 100 and 102 are roughly positioned between the last three wash water introduction points 11b, 11c and 11d. Thus, for example, it is the function of bridge 98 to block off the egress of filtrate to take-off cone 94. In other words, the wash water introduced on to the surface of the pan by the first spray head 11a is drawn off only through take-off cone 97. Similarly, the filtrate derived from the wash water introduced onto the pan by spray head 11b is drawn off only through take-off cone 94. The other bridges 102 and 104 serve the same function, i.e. to take off the filtrate derived from the wash water introduced by spray heads 11c and 11d. It can be appreciated that many variations on the particular set-up shown in the drawings is possible. To start with, the take-off valve illustrated might be modified to have more or less than four take-off cones. Similarly, the bridges are adjustable circumferentially so that there is a number of different ways in which any particular take-off valve may be operated.

Figure 5:
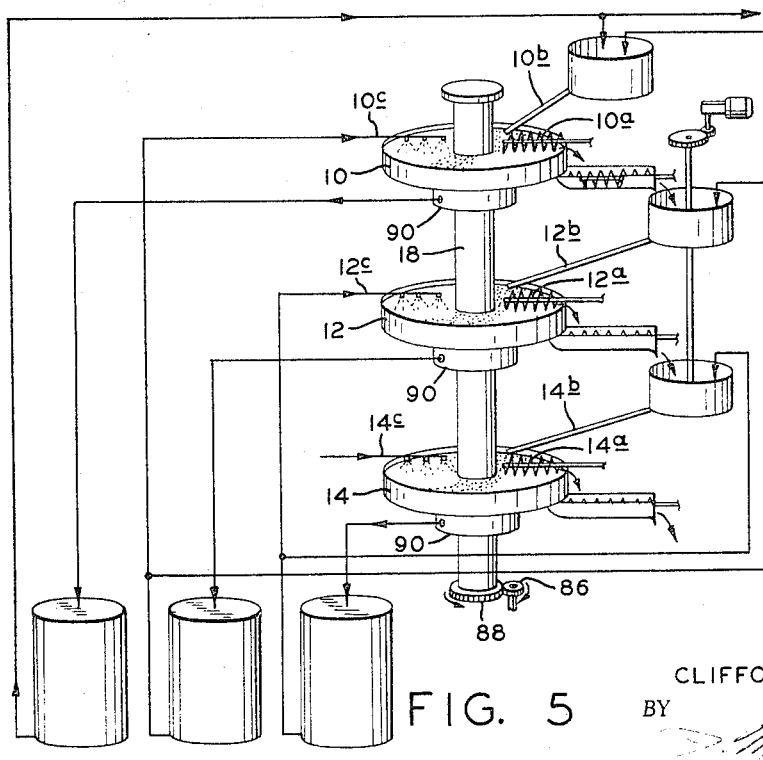
FIGURE 5 is a schematic diagram of a horizontal rotary filter assembly similar to the assembly shown in FIGURE 1 but employing only three horizontal filter pans and set up to carry out multi-stage washing.

Referring now to FIGURE 5, it will be understood that the apparatus schematically illustrated here is similar to the apparatus previously described in that the pans are arranged in a vertical array. Also, the arrangement is driven by a single drive unit operating to rotate the central column. Thus, the set-up of FIGURE 5 differs from the previous described apparatus only in that it is arranged to carry out multi-stage washing wherein pulp washed in the first filter pan at the top is repulped and fed on to the second pan and so on. To this end, the apparatus of FIGURE 5 includes a pair of intermediate repulpers, the construction of which is known to those familiar with this type of equipment. Apart from this variation, the other main difference is that the take-off valves positioned beneath the pans are illustrated as adapted to remove only a single filtrate from the central column but this is just an illustrative example and it will be understood that many combinations of filtrate take-offs and wash water introductions, etc., are possible.

The set-up of FIGURE 5 does have the advantages previously mentioned wherein a considerable saving in floor space is achieved by the vertical stacking of the filter pans and wherein a single drive unit may be used to rotate all the pans. However, the set-up of FIGURE 5 does have the additional advantage that in a multi-stage washing process, the pulp can be fed from one pan to the other by gravity thereby eliminating the need for pumps between pans as are required where the pans are arranged side by side.

Figure 6:
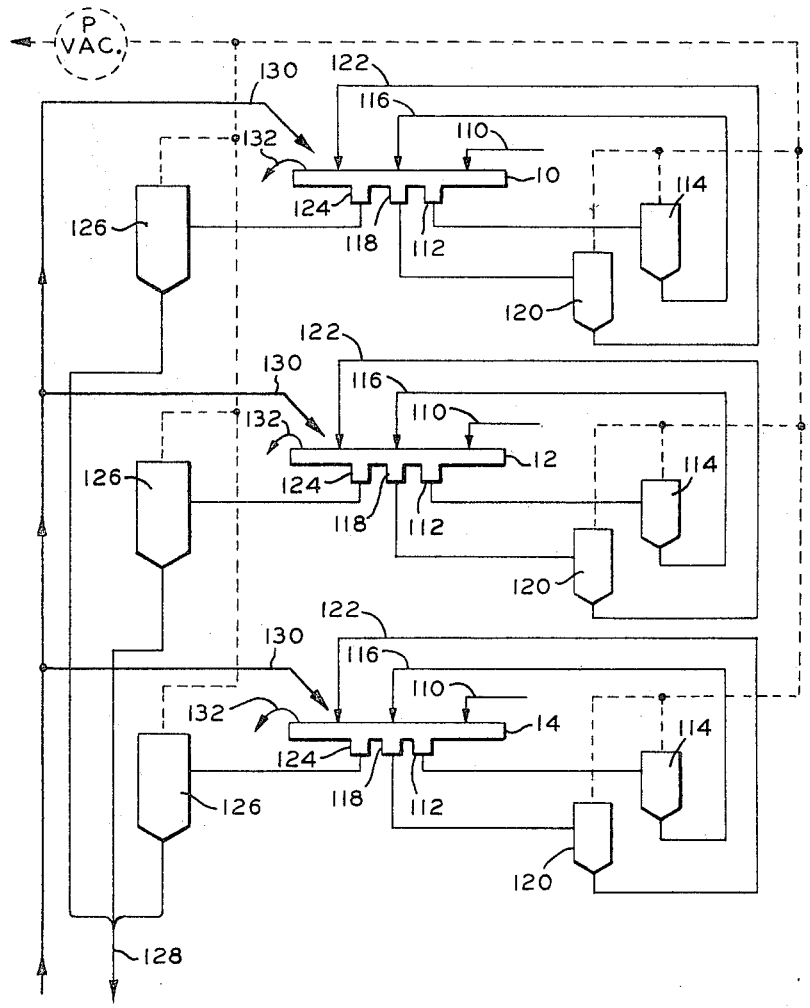
FIGURE 6 is a flow sheet diagram of an assembly having three pans operating in parallel and having three stages of wash on each unit.

The flow sheet diagram of FIGURE 6 will be readily understood by those familiar with horizontal rotary filters per se. The pans themselves are shown only schematically and it will be understood that whereas the filtrate take-offs are shown as being positioned side by side beneath the pans, these take-offs will in fact be similar to the take-off valves described earlier. It should also be understood that the pans are preferably mounted on a common central shaft.

It will also be appreciated that the assembly schematically illustrated in FIGURE 6 is set up to carry out countercurrent washing, i.e. there is a plurality of washes carried out on each pan through recycling of the initial wash water. In the illustrated case, the initial wash waters are introduced on to the slurries by lines 110 with the first filtrate being drawn off through the first valve outlet 112. These first filtrates are received in first separation receivers 114 and recycled for a second introduction on to the slurries by lines 116. The second filtrates are taken off through second outlet cones 118 and received in second separation receivers 120 and recycled for a third introduction on to the deposited slurries through lines 122. The final filtrates are taken off through the outlet cones 124 and received in the liquor receivers 126 having a common drain 128.

The pulp or other slurries to be washed are introduced on to the pans by lines 130 and the filtered cake is taken off by the usual scroll devices 132. Also schematically illustrated is a typical vacuum circuit (broken lines).

In the case of a counter-current washing process of the type shown in FIGURE 6, the chief advantage of the vertical array of the pans is also gained, i.e. there is a very considerable saving in floor space. Further, of course, it is possible to rotate all of the pans by a single drive means connected to a central common shaft.

The embodiments of the invention in which an exclusive property or privilege is claimed are defined as follows.

I claim:
1. Horizontal rotary table filter apparatus which comprises
a purality of filter pans vertically spaced from one another, and having a common vertical axis, said pans being subdivided into sector-shaped filtration chambers,
a vertical central hollow shaft connecting said filter pans with one another, and constituting therewith a rotary assembly, said shaft having a bottom closure and having internal vertical partition means subdividing the interior of the shaft into vertical ducts each having upper filtrate passage openings communicating with respective filtrate chambers of each respective pan, and having lower filtrate discharge openings below each respective pan, said shaft also having transverse partition means provided between each set of lower openings and the next lower pan, so that the filtrate discharges separately from each pan,
main stationary structure providing vertical guidance for said rotary assembly when rotated about said vertical axis,
vertical thrust bearing means for said rotary assembly,
stationary valve means surrounding the shaft and each set of said lower filtrate discharge openings, and constructed and arranged for controlling the filtration cycle and delivering the filtrate from the respective associated pan,
drive means for rotating said rotary assembly,
filter cake removal and discharge means for each said pan,
and means for feeding pulp to be filtered to each pan.
2. The filter apparatus according to claim 1, wherein said cake removal means comprise a conveyor screw extending radially of each pan,
and auxiliary structure for supporting each conveyor screw, the inner of which structure is carried by said shaft, and the outer end of which is carried by said main structure.
3. The filter apparatus according to claim 1, with the addition of equipment for countercurrent pulp washing operation, which comprises cake wash water supply means for each pan,
means for repulping filter cake discharging from each respective pan with spent wash water from the next lower pan, to provide feed pulp for said next lower pan,
means for supplying to each respective pan spent wash water derived from said next lower pan to the preceding higher pan.
4. The filter apparatus according to claim 1, wherein said vertical partition means in the shaft comprise a vertical rod in said hollow shaft concentric therewith and extending from end to end thereof, and vertical partitions extending radially from said rod.
5. The filter apparatus according to claim 1, wherein said valve means comprise a cylindrical stationary housing surrounding said shaft, and having outlet means for the filtrate, and also having sealing means both at the upper and lower end, effective between said stationary valve housing and said hollow shaft.
6. The filter apparatus according to claim 1, wherein annular thrust bearing means concentric with said vertical axis of rotation are provided for at least one of said pans to support said pan assembly for rotation upon said main structure.
7. The filter apparatus acording to claim 1, wherein said stationary valve means comprise a number of hollow sections within which said shaft rotates, means for maintaining said bodies in fluid tight relation to said shaft, a plurality of outlets extending outwardly from the respective sections, and dam means blocking off selected portions of the interior of said shaft from selected ones of said sections.
8. A horizontal rotary filter assembly comprising a mounting structure, a plurality of horizontal rotary filter pans supported by said mounting structure one above the other, said filter pans each including a filter medium, means for rotating each of said filter pans, means for depositing slurries onto each of said filter pans, means for introducing wash water onto slurries deposited on said pans, means for removing cake from each of said pans, and means for removing filtrates from each of said pans,
wherein each of said pans is connected to a central rotatable shaft, said means for rotating said pans including means for rotating said shaft,
wherein said central shaft is hollow, said means for re- moving filtrates from said pans consisting of openings in the side wall of said shaft connecting the interior of the shaft with the underside of said filter mediums, wherein said means for introducing wash water onto said slurries includes a plurality of nozzles for introducing said wash water onto said slurries at circumferentially spaced points and wherein said hollow shaft is compartmented by means of vertically extending partition members whereby filtrates from any one pan may be kept separated from one another, wherein said shaft is also divided into a plurality of vertically spaced compartments by transversely extending partition members whereby filtrates taken off from different pans may be kept separated from one another, wherein said filter assembly further includes a valve assembly carried by said shaft beneath each of said filter pans, each of said valve assemblies being adapted to take off filtrates collected within said shaft while keeping said filtrates separate from one another, and wherein each of said valve assemblies comprises a hollow body within which said shaft rotates, means for connecting said body to said shaft in a fluid-tight fashion, means for holding said valves fixed while said shaft rotates therein, a plurality of outlet cones extending outwardly from said body, apertures in the wall of said shaft, and dam means blocking off selected portions of the interior of said shaft from selected ones of said cones.

References Cited

UNITED STATES PATENTS

| 3,107,217 | 10/1963 | Muller | 210—344 X |
| 3,361,262 | 1/1968 | Orr et al. | 210—333 X |
| 3,416,668 | 12/1968 | Lobley | 210—344 X |
| 1,229,839 | 6/1917 | Wedge | 210—332 |

FOREIGN PATENTS

| 484,020 | 6/1927 | Germany. |

REUBEN FRIEDMAN, Primary Examiner

F. A. SPEAR, Assistant Examiner

U.S. Cl. X.R.

210—327, 330, 334, 344